March 12, 1968 W. J. OPOCENSKY 3,372,600

COMPUTING INTEGRATOR

Filed Sept. 28, 1965

INVENTOR.
WILLARD J. OPOCENSKY

BY [signature]
ATTORNEY

United States Patent Office 3,372,600

Patented Mar. 12, 1968

3,372,600

COMPUTING INTEGRATOR

Willard J. Opocensky, Glendale, Calif., assignor to General Precision, Inc., a corporation of Delaware Filed Sept. 28, 1965, Ser. No. 490,885
4 Claims. (Cl. 74—194)

ABSTRACT OF THE DISCLOSURE

A compact construction for a ball-and-disc computing integrator. A housing plate supporting the disc thrust bearing is thinned adjacent one edge to provide a flexure section, and the opposite edge is urged toward the disc by a leaf spring, causing the plate to exert loading pressure on the disc through the thrust bearing.

This invention relates to computing integrators and, more particularly, to a novel and improved ball and disc integrator with a unique means for exerting force or loading upon the input disc to reduce slippage between the balls and disc.

Computing integrators, particularly the ball/disc/cylinder type, are well known in the art. A specific description of such a computing integrator may be found in Patent Number 2,602,338 issued July 8, 1952 to W. J. Opocensky et al.

Briefly described, this invention provides an improvement over prior art integrators that adapts them for miniaturization. This is accomplished by providing an integrator comprising the usual rotatable input disc with an input shaft coupled to the disc. A transmission means, generally in the form of a pair of balls, is positioned between the input disc and an output cylinder or disc and transmits the rotational motion from the input disc to the output cylinder or disc. The position of the balls on the radius of the input disc governs the speed of the output cylinder. Conventionally, there is provided a loading on the balls by means of a spring acting upon the input disc to urge it against the balls. Other conventional devices have loaded the output cylinder or disc. All of these methods take up a considerable amount of space and when reduction in size is desired the conventional manner of "loading" places a limit on the smallness of the integrator.

By this invention the balls are "loaded" by resiliently supporting the input disc in contact with the balls which in turn bear upon the circumference of the output cylinder disc in a unique manner. A plate extends adjacent the side of the disc opposite the balls. A bearing is placed between the plate and the disc and mounts the disc on the plate. One end of the plate is firmly affixed to the integrator's housing and has a channel cut along that end to permit bending of the plate along the line of the cut. Resilient means is provided to urge the plate toward the disc causing it to flex or bend along the relieved or cut portion; this in turn causes a pressure to be exerted upon the disc through the bearing and load the balls.

Figures 1, 2, 3, 4:
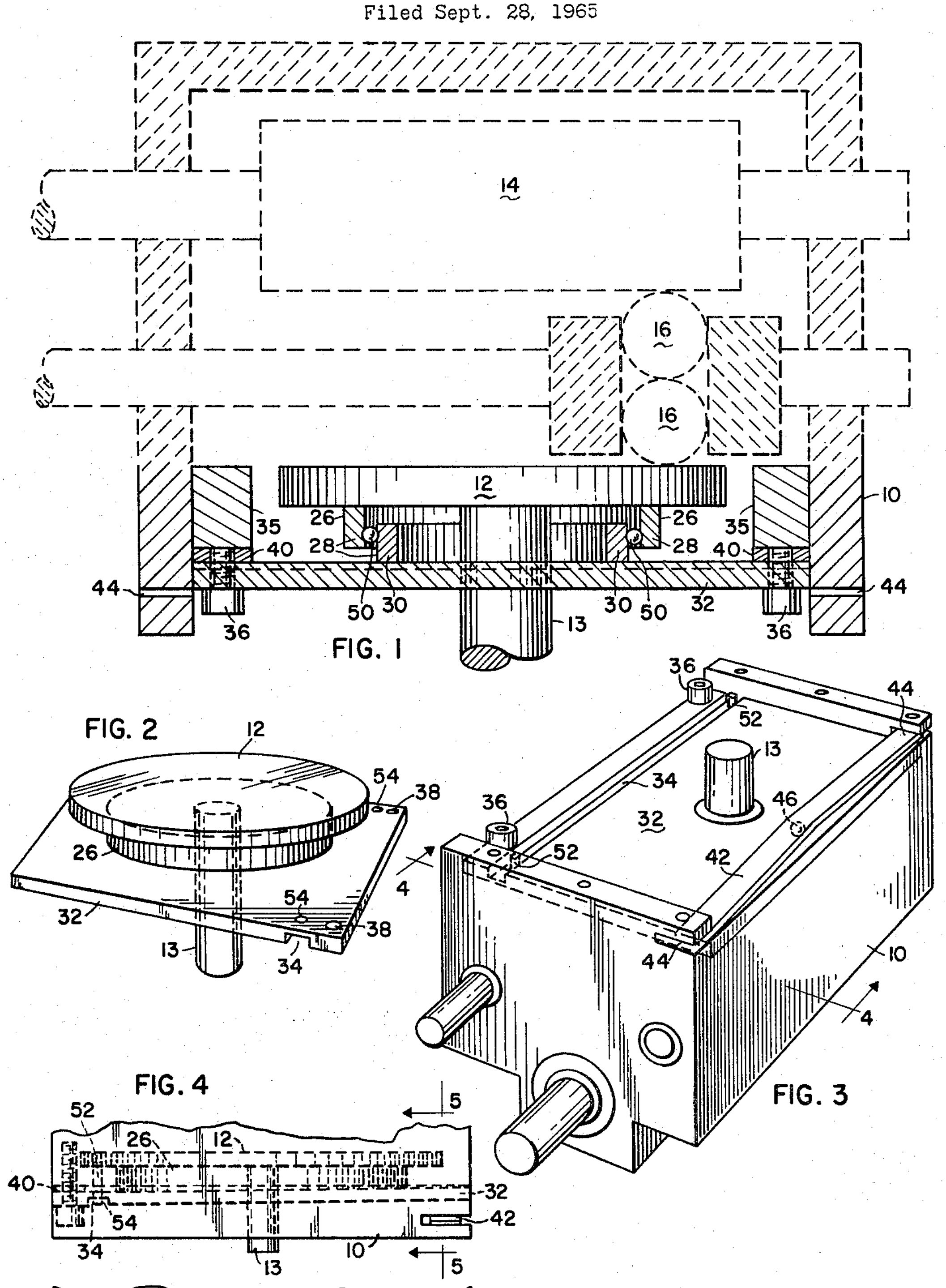
FIGURE 1 is a sectional view illustrating one embodiment of this invention.
FIGURE 2 is a perspective view showing the embodiment of this invention illustrated in FIGURE 1.
FIGURE 3 is another perspective view showing the embodiment of this invention completely encased within its frame.
FIGURE 4 is a partial section view of this invention taken along the lines 4—4 of FIGURE 3.
Figure 5:
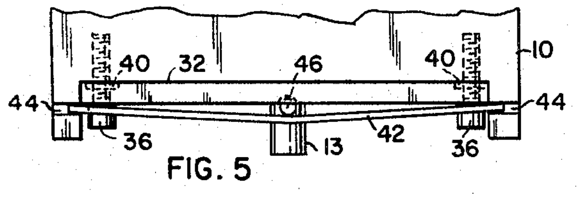
FIGURE 5 is an elevational view taken in the direction of the arrows 5—5 of FIGURE 4 illustrating the plate assembly embodying this invention.

Referring now to the drawings wherein like reference numerals designate like or corresponding parts throughout the several views, there is shown in FIGURE 1 the conventional housing 10 which provides an enclosure for an input disc 12 attached to an input shaft 13 and an output cylinder 14 and transmission balls 16 which form a driving engagement between the disc 12 and the cylinder 14, all of which are conventional in so-called ball and disc integrators.

In mechanical computing integrators of this type in order to eliminate slippage of balls 16, some sort of resilient force must be exerted between cylinder 14 and disc 12. In the preferred embodiment of this invention, this is accomplished by loading or applying pressure to disc 12 in a unique and novel manner. A thrust radial bearing 26, as shown in FIGURE 1, has an outer race 28 which extends above inner race 30 and an inner race 30 which extends below outer race 28. Thus outer race 28 only physically contacts the disc 12, and the inner race only engages a plate 32.

Plate 32 is relieved as shown to assure flexibility by a channel or groove 34 cut therein. One end of plate 32 is firmly affixed to lands 35 of housing 10 by bolts 36 through holes 38. A washer 40 or other suitable shimming means is provided to lift plate 32 slightly off lands 35 along one end. When bolts 36 are tightened down, plate 32 will be slightly raised from the housing 10 at the end opposite the end which is fastened to lands 35. It is to be here noted that while the dimensions of channel 34 are not critical it is imperative that it extend substantially parallel to the travel of balls 16.

A leaf spring 42 is used to resiliently urge plate 32 toward balls 16. This is accomplished by placing leaf spring 42 into slots 44 cut in housing 10 as shown. A locking ball 46 is placed between leaf spring 42, which has an indentation (not shown) cut therein for receiving ball 46. Plate 32 may also have a similar indentation, also not shown, to receive ball 46. As will be obvious ball 46 locks spring 42 in place but permits freedom of up and down motion of plate 32. This provides for permanent resilient pressure to be exerted directly upon the center of plate 32.

Shaft 13 of disc 12 extends through plate 32 and is rotatably affixed thereto in any suitable manner. Plate 32 bears against the inner race 30 of bearing 26 and outer race 28 bears against disc 12 thus when pressure is applied to plate 32 pressure is exerted on disc 12 through bearing 26. The pressure from spring 42 thereby resiliently loads balls 16 between disc 12 and cylinder 14 and thus prevents slippage.

A pair of dowels 52 may extend from plate 10 and extend through holes 54 in plate 32 to align plate 32 and disc 12 in housing 10.

When leaf spring 42 is snapped into slot 44, the surface of disc 12 may become inclined so that it is not parallel to the axis of cylinder 14. Such an angle will not in any event affect the contact of balls 16 upon the surface of disc 12 because the movement of balls 16 is parallel to the axis of any inclination of the surface of disc 12.

Thus having explained one preferred embodiment of this invention, what is claimed is:

1. In an integrator comprising
   (a) a housing,
   (b) a rotatable input disc,
   (c) an output member,
   (d) motion transmission means between said disc and said output member for transmitting rotation from said input disc to said output member, said motion transmission means being movable diametrally of the face of said disc, and (e) means for resiliently urging said input disc in contact against said transmission means comprising
(i) a plate mounted on said housing, said plate having an edge secured to said housing and having a portion relieved for flexibility and extending across the plate adjacent to said edge,
(ii) bearing means mounting said input disc on said plate
and
(iii) resilient means urging said plate against said input disc through said bearing means and said disc against said motion transmission means.

2. An integrator as set forth in claim 1 wherein said plate is relieved along a line paralleling the line of movement of said motion transmission means to permit flexure thereof along said line.

3. An integrator as set forth in claim 1 wherein said resilient means is a leaf spring extending parallel to said movement of said motion transmission means and extending into slots provided in said housing.

4. An integrator as set forth in claim 3 wherein said leaf spring is locked into place by means of a ball placed in an indentation provided in said plate and said leaf spring and centered between said slots.

References Cited

UNITED STATES PATENTS

| | | | |
|---|---|---|---|
| 1,448,490 | 3/1923 | Moakley ____________ | 74—198 |
| 3,030,012 | 4/1962 | Mershon et al. _______ | 74—194 |
| 3,097,539 | 7/1963 | Opocensky __________ | 74—194 |
| 3,204,477 | 9/1965 | Mermelstein ________ | 74—198 |

FRED C. MATTERN, Jr., *Primary Examiner.*

C. J. HUSAR, *Assistant Examiner.*